L. M. SELLS AND W. HEBERN.
AUTOMOBILE LOCK.
APPLICATION FILED MAR. 9, 1920.
1,365,858.
Patented Jan. 18, 1921.
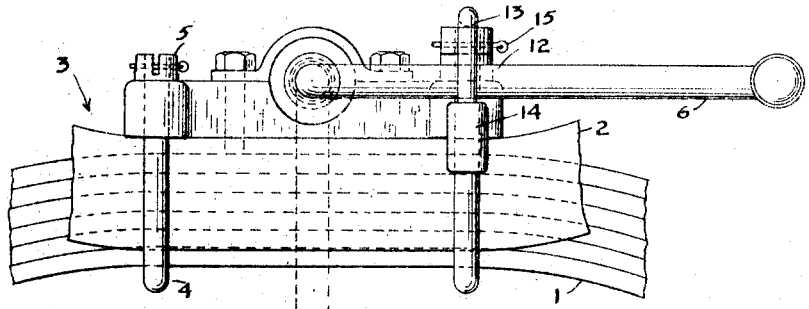
FIG. 1
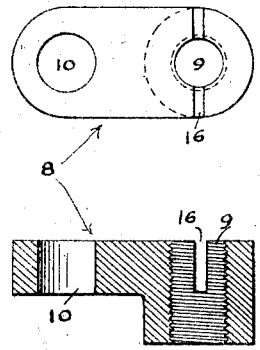
FIG. 3
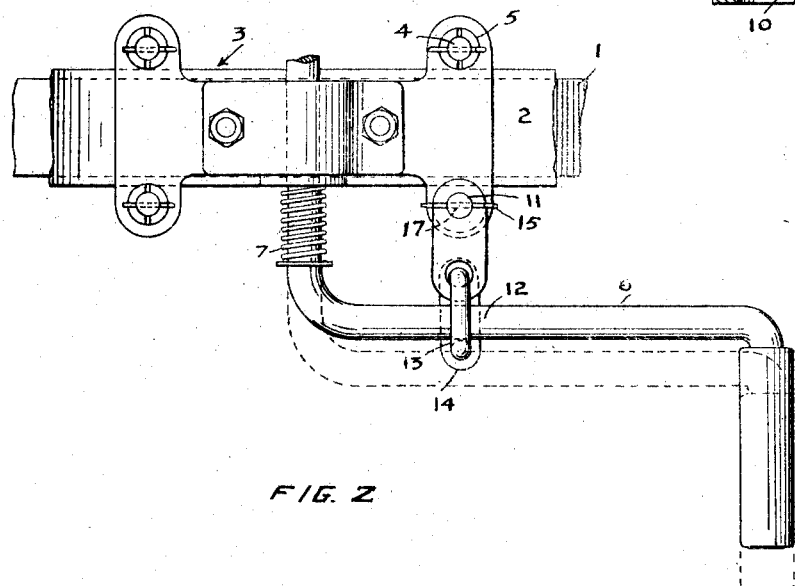
FIG. 2
FIG. 4
INVENTORS
L. M. SELLS
W. HEBERN
BY
ATT'YS.

UNITED STATES PATENT OFFICE.

LOUIS M. SELLS AND WILLIAM HEBERN, OF OAKLAND, CALIFORNIA; SAID HEBERN ASSIGNOR OF ALL HIS RIGHT TO SECURITY AUTO LOCK CO., A COPARTNERSHIP CONSISTING OF ALBERT J. GRAY, WILLIAM HEBERN, AND DAVID GUILD, JR.

AUTOMOBILE-LOCK.

1,365,858.  Specification of Letters Patent.  Patented Jan. 18, 1921.

Application filed March 9, 1920. Serial No. 364,455.

*To all whom it may concern:*

Be it known that we, LOUIS M. SELLS and WILLIAM HEBERN, citizens of the United States, and residents of Oakland, in the county of Alameda and State of California, have invented new and useful Improvements in Automobile-Locks, of which the following is a specification.

The primary object of this invention is to provide a relatively simple, inexpensive, easily attachable and reliable locking device for automobiles whereby an automobile equipped with the locking device will be safeguarded against theft.

Another object of the invention is to provide a lock of the character described which consists of but two parts, one of which may be quickly and easily attached to the automobile without the use of extra fastening or securing means and the other of which is a padlock adapted to coöperate with the other part to hold the starting crank located against movement in "pushed in" or clutched position such as effected when the engine is to be cranked. With the crank thus locked cranking of the engine by hand or by a "starter" will be prevented and the appropriation of the automobile by unauthorized persons will be prevented.

The invention possesses other advantages and features, some of which, with the foregoing will be set forth at length in the following description wherein we shall outline in full that form of the invention which we have selected for illustration in the drawings accompanying and forming a part of the present specification. In said drawings, we have shown one form of the construction of our invention but it is to be understood that we do not limit ourselves to such form, since the invention as expressed in the claim may be embodied in a plurality of forms.

Referring to the drawings:

Figure 1 is a fragmentary front elevation of the front of a well known type of automobile showing the lock of this invention.

Fig. 2 is a fragmentary plan view showing the lock, as when locked, and as unlocked in dotted lines.

Fig. 3 is a top plan view of the locking plate.

Fig. 4 is a longitudinal sectional view taken through the locking plate.

In carrying out our invention, we remove one of the nuts from a U-bolt which bolt holds the front spring to the front frame piece of a well known type of automobile and screw on to said bolt in place of the nut a locking plate having an opening in one end. This bolt is so positioned relative to the starting crank and the locking plate is of such size that when the plate is mounted thereon, the crank when "pushed in" to enclutch the engine and brought in line with the plate will lie close to, but spaced from, said plate. A padlock is inserted through the opening in the plate and around the crank and when locked holds the crank against movement, in "pushed in" position. This locks the engine against being turned and prevents the starting of the engine with the result that the automobile is protected against theft.

Referring particularly to the drawing, 1 designates the front spring of an automobile of a well known type. This spring rests in a channeled front piece 2 of the frame 3 and is held in the frame 3 in place by U-bolts 4 having nuts 5 turned on their upper ends. The starting crank 6 extends outwardly between these U-bolts and has the customary spring 7 thereon to normally hold the crank "disengaged" from the motor or engine.

Our invention comprises a short thick metal locking plate 8 having a screw threaded opening 9 near one end and a plain aperture or opening 10 at its other end. The nut 5 on one end of one of the U-bolts is removed. The locking plate is screwed on to the threaded end 11 of this U-bolt, said end 11 engaging in the threaded opening 9, until the plate is tight on the bolt with the apertured end 10 forwardly disposed as shown in Figs. 1 and 2.

To lock the crank it is pushed in so as to engage with the engine crank shaft, not shown, in the ordinary manner and then turned so as to bring the portion 12 thereof in line with the locking plate. The shackle 13 of a padlock 14 is inserted through the opening 10 and around the crank and then locked. The crank is now locked in engine engaging or pushed in position so that it cannot be moved. The owner of the automobile carrying the key for the padlock may unlock and remove the padlock when desired. The crank when pushed in and cranked or turned will clear the locking plate but in locking the crank the padlock holds the crank to the locking plate so as to prevent the spring from pushing the crank out of "pushed in" position as well as to hold the crank against turning. The padlock prevents unscrewing of the locking plate when locked thereto and to prevent the plate from working loose a cotter pin 15 is inserted through an aperture 16 in the plate and through the cotter pin opening 17 formed in the bolt 4.

We claim:—

The combination with an automobile having a starting crank and a screw threaded bolt which latter is a part of the automobile and located adjacent to the crank, of a straight one-piece plate having a vertical screw threaded opening in one end, receiving said screw threaded bolt, projecting outwardly therefrom and holding the bolt in place, said plate having a vertical opening in its other end and a device for locking said crank to said plate including a shackle embracing said crank and extending through said last-named opening.

LOUIS M. SELLS.
WILLIAM HEBERN.